INVENTOR.
JOHN P. LAW

INVENTOR.
JOHN P. LAW

United States Patent Office 3,297,199
Patented Jan. 10, 1967

3,297,199
FASTENER ESCAPEMENT INCLUDING A DISCHARGE ASSISTANT MEANS
John P. Law, Athens, Pa., assignor to Ingersoll-Rand Company, New York, N.Y., a corporation of New Jersey
Filed Aug. 30, 1965, Ser. No. 483,681
7 Claims. (Cl. 221—93)

This invention relates to an escapement for receiving a plurality of headed fasteners and dispensing the fasteners singly to one or more fastener conveying conduits.

Conventional escapements for headed fasteners are relatively unreliable and subject to jamming. One reason for this tendency to jam is because they do not properly control, guide, and center a fastener while dispensing it. Finally, in general, after jams develop in conventional escapements, it is relatively difficult to clear such jams rapidly.

The principal object of this invention is to provide an escapement for headed fasteners which either overcomes or substantially minimizes the defects in prior escapements.

Other important objects of this invention are: to provide an escapement which is relatively reliable; to provide an escapement which maintains control over the fastener and guides and centers it at all times during its dispensing movement; to provide an escapement in which jams can be cleared easily and rapidly so that further operation of the escapement can be continued; and to provide an escapement which dispenses a plurality of fasteners singly to a plurality of respective fastener conveying conduits or openings.

These objects are attained in an escapement which briefly comprises a frame having an inclined trackway for receiving a row of fasteners having heads resting on the trackway, a dispensing chute located beside the trackway, a transfer passage interconnecting the trackway and the chute, a carrier movably mounted on the frame for conveying a fastener from the trackway through the transfer passage to the chute, and a holder mounted on the frame for movement into the chute to catch the fastener after it drops clear of the carrier and to prevent the drop of the fastener further through the chute until the carrier is retracted.

The invention is described in connection with the accompanying drawings wherein.

Figure 1:
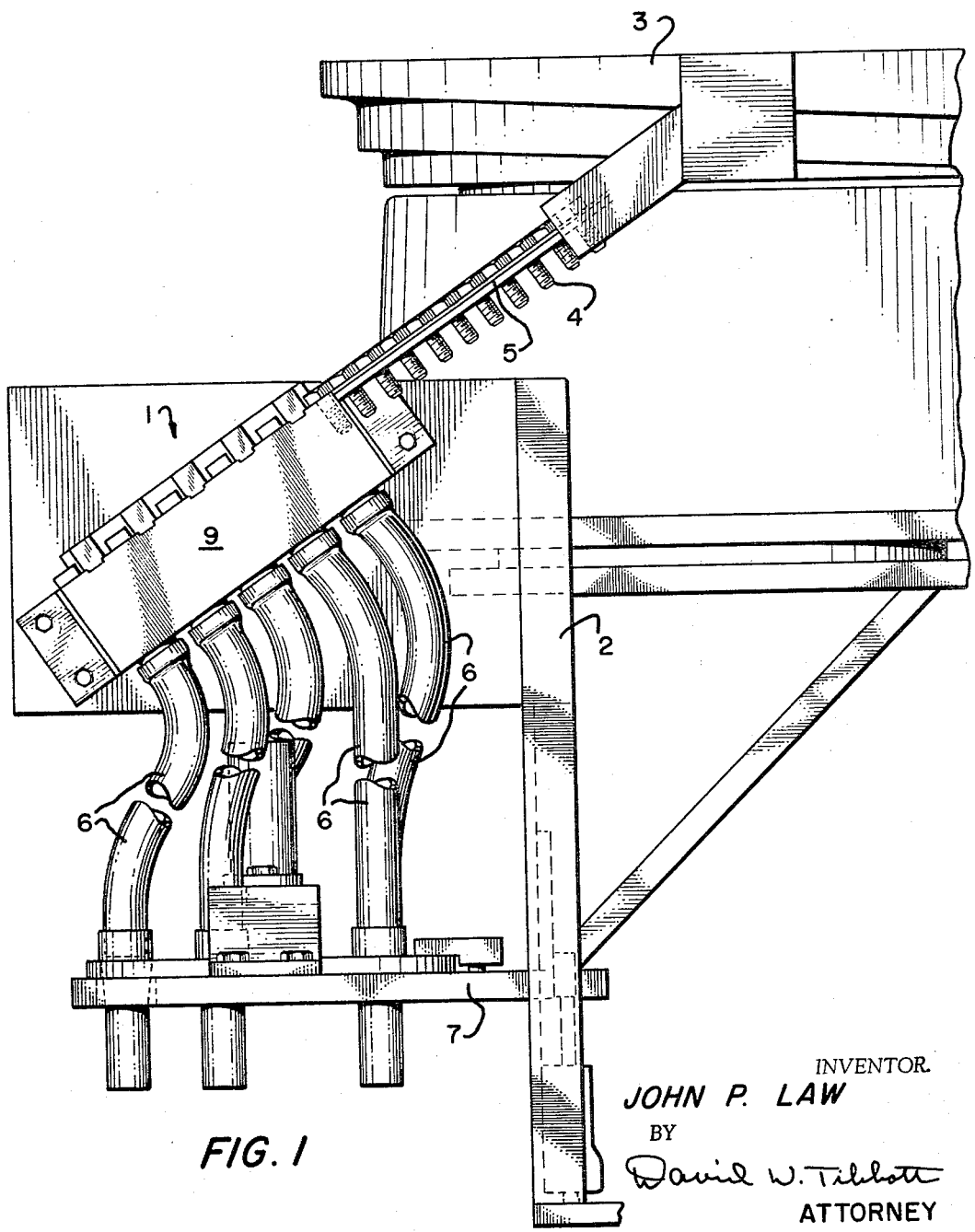
FIG. 1 is an elevational view with portions broken away of the escapement of this invention combined with a conventional bolt sorter and a fastener positioning means receiving bolts from the escapement.
Figure 2:
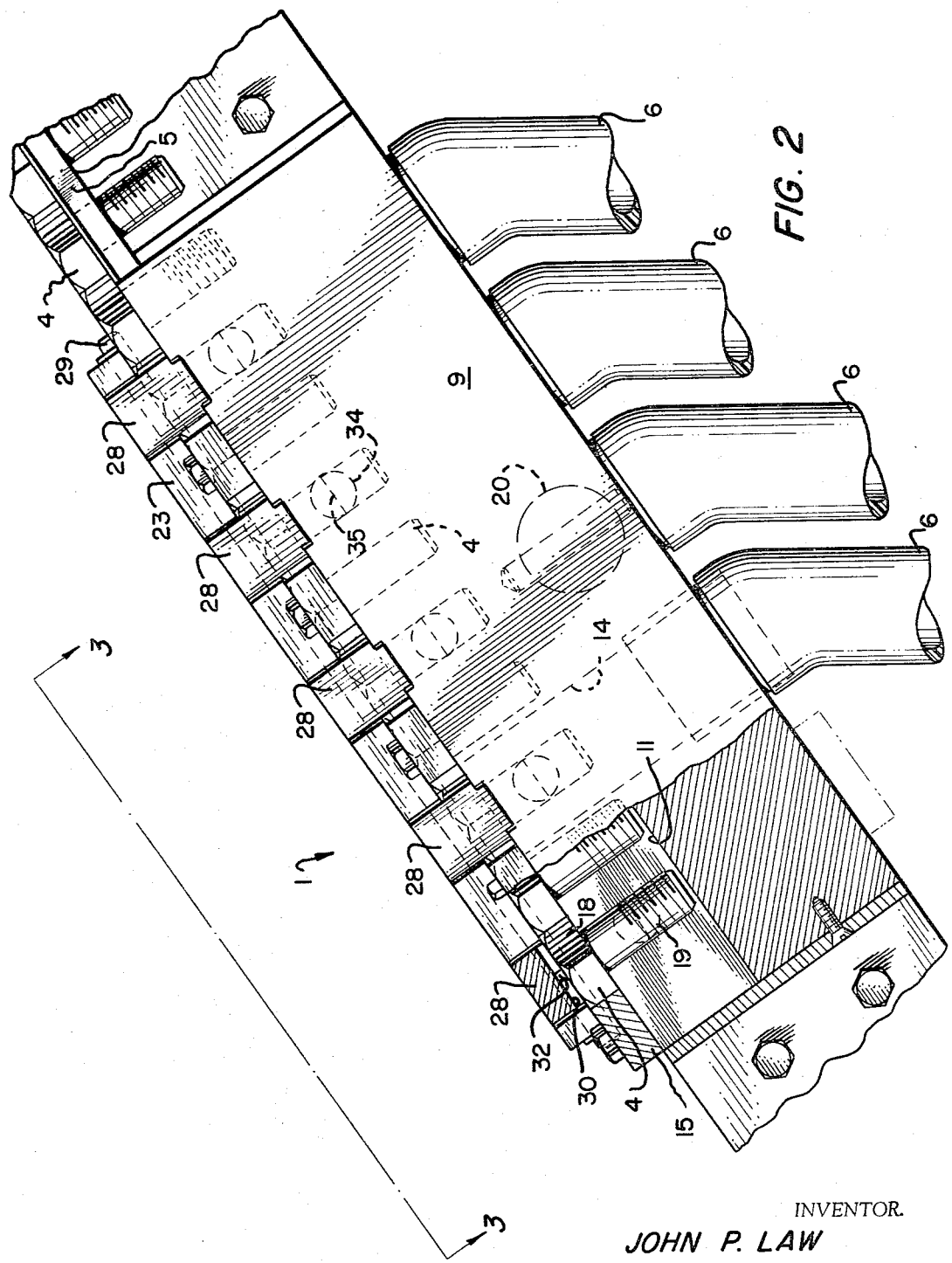
FIG. 2 is an elevational view with portions cut away of the escapement shown in FIG. 1.

FIG. 1 illustrates the escapement 1 mounted on a stand 2 supporting a bolt sorter 3. The escapement 1 is illustrated receiving a row of bolts 4 from a track 5 interconnecting the escapement 1 and the bolt sorter 3. A series of bolt conveying hoses 6 extends from the escapement 1 to a bolt positioner 7 mounted on the stand 2. This invention is limited to the escapement 1. The only reason for showing the remaining structure in FIG. 1, other than the escapement 1, is to illustrate the use of the escapement.

The escapement 1 comprises a frame 9 containing a bolt trackway 10 extending substantially the length of the frame 9. The trackway 10 is formed by a longitudinal vertical slot 11 running the length of the frame 9 and a pair of spaced rails 12 and 13 located on the opposite sides of the slot 11. The pair of rails include a rear rail 12 and a front rail 13. The frame 9 further contains a row of substantially vertical fastener receiving holes or chutes 14 extending the length of the frame beside the trackway 10 and offset from the trackway 10. The fastener receiving chutes 14 are connected to the bolt conveying hoses 6 illustrated in FIG. 1. A stop 15 is mounted at the end of the trackway 10 to stop the bolts 4 and to position the row of bolts 4 properly in the trackway 10.

Figure 3:
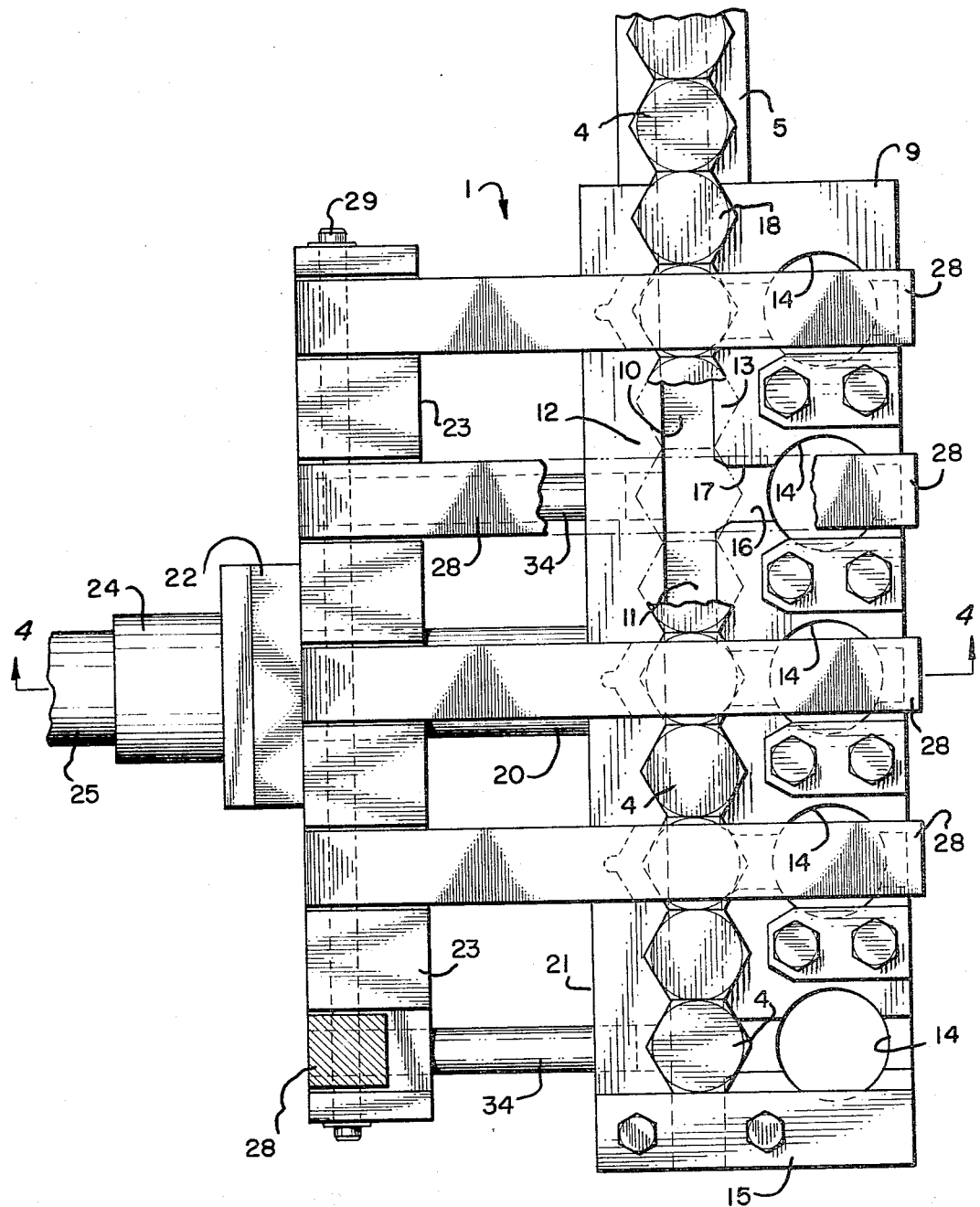
FIG. 3 is a plan view of the escapement taken along the line 3—3 of FIG. 2.

Each of the fastener receiving chutes 14 is interconnected to the trackway 10 by a fastener transfer passage 16. Each transfer passage comprises a slot, also indicated as 16, and a pair of spaced shoulders 17 located on the opposite sides of the slot 16. FIG. 3 illustrates that the rails 12 and 13 of the trackway 10 are located to support the heads 18 of the bolts 4 with the bolt stems 19 projecting into the slot 11. Likewise, the shoulders 17 are located to support the bolt heads 18 while the bolt stem 19 can move through the slot 16 of the transfer passage. It will be noted that the transfer passages 16 interrupt the front rail 13 of the trackway 10. The transfer passages 16 are spaced apart from each other so that when a row of bolts 4 are supported in the trackway 10, alternate bolts in the row are aligned with the respective transfer passages 16.

A guide rod 20 is fixed to the rear side 21 of the frame 9 to project laterally therefrom. A block 22 is fixed at the outer end of the guide rod 20 in laterally spaced relationship to the rear side 21 of the frame 9. An elongated carriage 23 is mounted on the guide rod 20 for reciprocating movement toward and away from the rear side 21 of the frame 9 over the length of the guide rod 20. The carriage 23 extends parallel to the frame 9 and is approximately the same length.

The carriage 23 is moved back and forth along the guide rod 20 by a fluid-operated motor 24 which includes a cylinder 25 and a piston rod 26. The forward end of the motor cylinder 25 is fixed to the block 22.

A series of parallel carrier fingers 28 are pivoted on the top edge of the carriage 23 by a pivot pin 29 extending the length of the carriage. Each of the carrier fingers 28 is located to extend over the trackway 10 and a respective transfer passage 16. The lower face of each carrier finger 28 contains a downwardly opening notch 30 adapted to fit over and receive the head 18 of a bolt 4 supported in the trackway 10. The front portion of each carrier finger 28 slides in a transfer passage 16 and the notch 30 is undercut at its forward side to provide a lip 31 which, when the carrier finger is retracted wherein the notch 30 is over the trackway 10, serves as a continuation of the front rail 13 which was broken by the formation of the transfer passage 16. In other words, the lip 31 forms a bridge for the front rail 13 so that the head 18 of a bolt located in the trackway 10 can slide on the lip 31 when the carrier finger 28 is located in its rearwardly retracted position.

Figure 4:
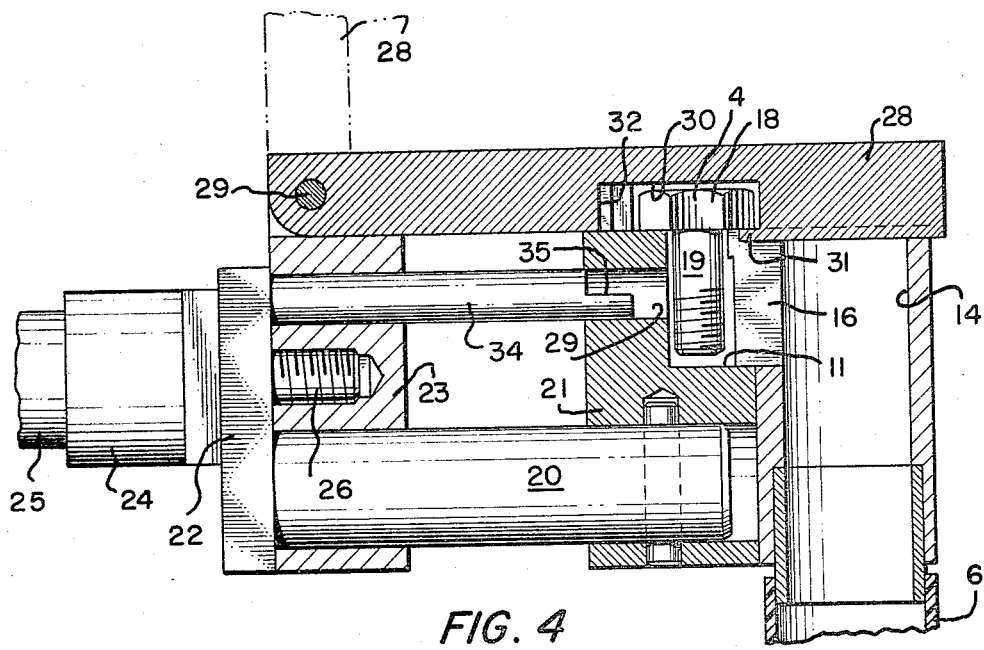
FIG. 4 is a sectional view taken along the line 4—4 of FIG. 3.
Figure 5:
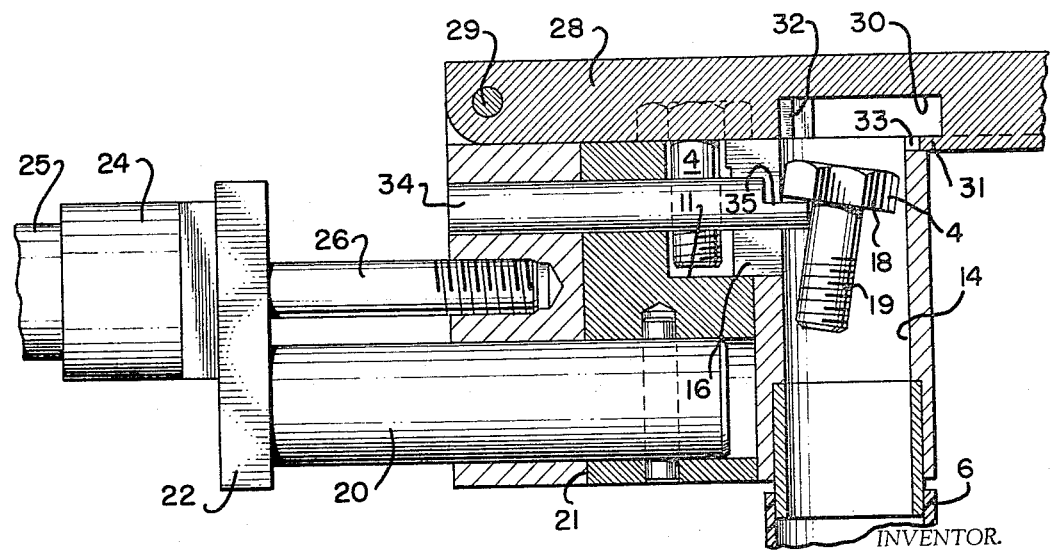
FIG. 5 is similar to FIG. 4 showing the escapement in a fastener dispensing position.

The rear wall 32 of the notch 30 is V-shaped to receive the apex of a hexagonal-shaped head 18 of a bolt 4. As a result of this construction, when the carrier finger 28 is located in its rearward position, as shown in FIG. 4, and a bolt 4 is centered beneath the carrier finger 28 with its head 18 lying in the notch 30, the front portion of the head 18 is resting on the lip 31. Thus, when the carriage 23 is moved forward by the motor 24, the carrier finger 28 moves forward until the V-shaped rear wall 32 of the notch 30 engages the bolt head 18 and forces it forward through the transfer passage 16. Ultimately the carriage 23 reaches the forward end of its travel and the bolt 4 moves into the chute 14 and drops off the lip 31, as shown in FIG. 5. Each carrier finger 28 rests in and slides in a shallow trench 33 formed in the frame 9 at the top of each chute 14 for guiding the finger 28.

The carriage 23 further carries or supports a series of combination pusher and holder pins 34 which extend forward from the carriage beneath the respective carrier fingers 28 and slide in openings 29 provided in the frame 9. The pins 34 are arranged to reciprocate simultaneously and in unison with the carrier fingers 28, since both are fixed to the carriage 23. As the carrier fingers 28 move forward, the holder pins 34 engage the stems 19 of the bolts 4 and, consequently, push the bolts 4 through the transfer passages 16 and into the chutes 14. As a result, the holder pins 34 aid in maintaining the bolts 4 under proper control to prevent them from tipping and jamming during their transfer.

When the bolts 4 reach the end of their travel and are dropped from the lips 31 of the carrier fingers 28 into the chutes 14, the heads 18 of the bolts drop far enough into the chutes 14 to clear the carrier fingers wherein they are resting on the front end of the holder pins 34, which serve to prevent the bolts from dropping further down the chutes 14. The forward end of the holder pins 34 are rabbetted to provide a flat 35 to aid in engaging the underside of the bolt heads 18, as shown in FIG. 5.

When the carriage 23 is retracted from its forward position, shown in FIG. 5, the carrier fingers 28 are able to move freely over the tops of the bolt heads 18 without interference from the bolts while the holder pins 34 are retracted from beneath the bolt heads 18 thus releasing the bolts to drop by gravity through the chutes 14 and into the bolt conveying hoses 6. At this time the bolts 4 drop the length of the hoses 6 to their proper position in the bolt positioner 7. The details of the bolt positioner 7 are not described in this application since they do not form any part of this invention.

Since the bolts 4 are held in the chutes 14 at the end of the forward movement of the carrier fingers 28 and are not dropped down the chutes until the fingers are retracted, the forward movement of the fingers 28 can be accomplished at a slow speed well before the moment of dispensing the bolts down the chute. Hence, the dispensing of the bolts 4 is carried out simply by retracting the carriage. It is obvious that once the bolts 4 reach the chutes 14, there is little likelihood of jams taking place; hence, jams are not likely to interfere with the act of dispensing the bolts 4 and any jams that might occur will take place during the extension movement of the carriage 23.

In the event that jams occur in the escapement 1, such jams can be easily cleared by lifting the carrier fingers 28 upwards to the dotted-line position shown in FIG. 4 wherein the operator can easily manipulate the bolts 4 to clear the jam. After clearing the jam the carrier fingers 28 are pivoted downward to their operating positions and the operation of the escapement can be continued. It will be understood that such jams may occur because of imperfectly formed bolts or other fasteners which are being used in the escapement.

Although only one embodiment of the present invention has been shown and described, it is to be understood that the invention is not limited thereto except by the scope of the claims. Various modifications and changes can be made without departing from the scope and spirit of the invention as the same will be understood by those skilled in the art.

Having described my invention, I claim:

1. An escapement for dispensing headed fasteners, comprising:

a frame having an inclined trackway including spaced parallel rails defining a slot therebetween for receiving a row of fasteners having heads resting on said rails with the fastener shanks depending in said slot;

a fastener dispensing chute provided in said frame sized to receive a single fastener and located beside said trackway in an offset relationship;

a transfer passage formed in said frame interconnecting said trackway and said chute for a fastener to pass through in being transferred from said trackway to said chute, said transfer passage being located between opposing shoulders formed on said frame to support the head of a fastener during its transfer from said trackway to said chute;

a carrier movably mounted on said frame for movement between a fastener receiving position and a fastener delivering position and arranged to engage the side of a fastener head for carrying said fastener from said trackway through said transfer passage to said chute; and a holder movably mounted on said frame for movement into said chute to catch the head of the fastener after it drops clear of said carrier and to prevent the drop of the fastener further through the chute until after the carrier is retracted to its fastener receiving position.

2. The escapement of claim 1 wherein:

said carrier includes a surface serving as a portion of the rail closest to the transfer passage when said carrier is in its fastener receiving position.

3. The escapement of claim 1 wherein:

said carrier extends over the head of a fastener during its transfer through said passage to prevent the fastener from tipping.

4. The escapement of claim 1 wherein:

said holder moves under and catches the head of a fastener in the fastener delivering position of said carrier.

5. The escapement of claim 1 wherein:

said carrier and said holder are moved simultaneously.

6. The escapement of claim 5 wherein:

said carrier engages the head of a fastener and said holder engages the stem of the fastener.

7. The escapement of claim 1 wherein:

said frame contains a plurality of said fastener dispensing chutes, said transfer passages, said carriers and said holders; and said plurality of transfer passages are spaced apart along said trackway at least the width of the head of a fastener so that alternate fasteners in said row are aligned with said transfer passages.

References Cited by the Examiner

UNITED STATES PATENTS

| | | | |
|---|---|---|---|
| 2,540,604 | 2/1951 | Van Sittert et al. | 221—238 |
| 2,544,165 | 3/1951 | Krasnow | 221—299 |
| 3,138,286 | 6/1964 | Schott | 221—238 |

FOREIGN PATENTS

| | | |
|---|---|---|
| 2,261 | 2/1899 | Great Britain. |

ROBERT B. REEVES, *Primary Examiner.*

WALTER SOBIN, *Examiner.*